United States Patent
Ekanayake et al.

(10) Patent No.: US 9,097,180 B2
(45) Date of Patent: Aug. 4, 2015

(54) APPARATUS AND METHOD FOR REDUCING OIL MIST INGESTION IN A HEAVY DUTY GAS TURBINE ENGINE

(71) Applicant: General Electric Company, Schenectady, NY (US)

(72) Inventors: Sanji Ekanayake, Mableton, GA (US); Alston Ilford Scipio, Mableton, GA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 206 days.

(21) Appl. No.: 13/752,000

(22) Filed: Jan. 28, 2013

(65) Prior Publication Data
US 2014/0208759 A1    Jul. 31, 2014

(51) Int. Cl.
*F02C 7/06* (2006.01)
*F01D 25/18* (2006.01)
*F01D 25/20* (2006.01)

(52) U.S. Cl.
CPC . *F02C 7/06* (2013.01); *F01D 25/18* (2013.01); *F01D 25/20* (2013.01); *F05D 2260/602* (2013.01); *Y02T 50/671* (2013.01)

(58) Field of Classification Search
CPC .............. F02C 7/06; F02C 7/14; F01D 25/18
USPC ........................................ 60/39.08; 184/6.11
See application file for complete search history.

(56) References Cited

U.S. PATENT DOCUMENTS

| | | | |
|---|---|---|---|
| 4,046,223 A * | 9/1977 | McHugh | 184/6.11 |
| 5,611,661 A | 3/1997 | Jenkinson | |
| 6,470,666 B1 | 10/2002 | Przytulski et al. | |
| 7,836,675 B2 * | 11/2010 | Corattiyil et al. | 60/39.08 |
| 7,867,310 B2 | 1/2011 | Baten | |
| 2009/0101444 A1 | 4/2009 | Alecu | |

* cited by examiner

*Primary Examiner* — William H Rodriguez
*Assistant Examiner* — Rene Ford

(57) ABSTRACT

A lubrication system for a heavy duty gas turbine includes a bearing lubrication assembly coupled to the bearing and an oil and vapor extraction assembly disposed in a cavity defined by a bell mouth hood in an air inlet duct. A high volume vacuum blower is coupled to the oil and vapor extraction assembly to provide a relative negative pressure. An oil and vapor separator is disposed downstream from the high volume vacuum blower. The lubrication system also includes a control subsystem that maintains a cavity pressure lower than an air inlet pressure.

18 Claims, 3 Drawing Sheets

APPARATUS AND METHOD FOR REDUCING OIL MIST INGESTION IN A HEAVY DUTY GAS TURBINE ENGINE

TECHNICAL FIELD

The subject matter disclosed herein generally relates to heavy duty gas turbine engines and more particularly to systems and methods for preventing fouling of a compressor due to oil mist generated by compressor bearings.

BACKGROUND

Gas turbine engines include a compressor, a combustor, and a turbine coupled to the compressor. The combustor can include a plurality of combustor cans. Compressed air and fuel are delivered to the combustor cans to produce high-velocity and high-pressure combustion gases. These combustion gases are discharged to the turbine. The turbine extracts energy from the combustion gases for producing power that can be used in several ways such as, for example, to power the compressor, to power an electrical generator, or to power an aircraft. Stationary gas turbines can be divided into two categories; heavy duty industrial and aeroderivative.

Heavy duty gas turbines are designed specifically for ground based operation, where size and weight are not a constraint. Heavy duty gas turbines are designed for reliable operation and minimal maintenance at a competitively low installed cost. They accommodate a wide range of fuels including natural gas, light and heavy distillate oil, naphtha, crude, residual oil, among others.

An aeroderivative gas turbine is essentially an aircraft engine adapted for use in marine and industrial applications. The power generation capacity of these machines is typically in the 10 to 50 MW range. Aeroderivative gas turbines are relatively light construction, operate at high speeds, and generally use rolling element bearings. They have a narrower range of gaseous fuels that can be used.

There are significant variations between the aero-derivative and heavy industrial gas turbines. Among the variations are weight, combustor design, turbine design, and bearing design (including the lube-oil system). The primary distinction is in the bearing selection where the heavy duty gas turbines use hydrodynamic (journal) bearings and the aero-derivatives use anti-friction (ball or roller) bearings.

Hydrodynamic bearings and anti-friction bearings require lubrication to reduce friction and wear. In some cases, bearing assemblies include a supply pump that supplies lubricating oil under pressure to the bearing assemblies, and a scavenge pump that removes lubricating oil from the sump. In some cases lubrication of the bearings leads to leakage of the lubricant in the form of oil mist and vapor into the compressor. Any wetting of the blades or vanes by oil vapor will promote the accumulation of dust and dirt. A dirty blade or vane represents high friction-to-airflow that decreases engine efficiency, and results in a noticeable decrease in thrust or increase in fuel consumption.

To prevent oil leakage in some aeroderivative gas turbines the bearing may be disposed in a bearing housing within a pressurized assembly. The bearing housing and the pressurized assembly are isolated from the surrounding environment by labyrinth seals that extend around the rotor shaft. During operation, compressed air is supplied to the pressurized assembly to maintain a positive pressure around the bearing housing. This reduces oil leakage. In one example, disclosed in U.S. Pat. No. 6,470,666, an evacuation system that reduces the pressure within the bearing housing is provided. The evacuation system includes an air pump disposed downstream from an air/oil separator. During low power or idle operations, when there is insufficient air supply pressure from the bearing housing or cavity pressurization air supply, the air pump draws air from the bearing housing through the air/oil separator, such that an operating pressure within the bearing housing is reduced below the pressure within the pressurized assembly. For the system to operate successfully, the seals between the bearing housing and the pressurized assembly, and the seals between the pressurized assembly and the surrounding environment must be maintained. This configuration disclosed in U.S. Pat. No. 6,470,666 will function in a compromised manner in a heavy duty gas turbine application since the lube oil reservoir in a heavy duty gas turbine is vented and maintained at atmospheric pressure. Having the oil/vapor separator on the vacuum side of the evacuation pump will prevent the separated oil from flowing back to the lube oil reservoir due to the negative pressure differential. In a heavy duty gas turbine the negative pressure assembly must be capable of continuous duty, as compared to the system disclosed in U.S. Pat. No. 6,470,666, which operates during engine low-power and idle operations. Additionally, heavy-duty gas turbines are not equipped with a bearing housing pressurization air supply as that supply air flow constitutes a parasitic loss on the overall output and efficiency of the gas turbine.

BRIEF DESCRIPTION OF THE INVENTION

The disclosure provides a means for preventing oil leakage into a compressor in the form of oil mist or vapors from a lubricated bearing.

In accordance with one exemplary non-limiting embodiment, the invention relates to a lubrication system for a heavy duty gas turbine having an air inlet duct, an air inlet assembly disposed in the air inlet duct, the air inlet assembly having a bell mouth hood defining a cavity, and a bearing disposed in the cavity. The lubrication system includes a bearing lubrication assembly coupled to the bearing. The lubrication system also includes an oil and vapor extraction assembly disposed in the cavity and a negative pressure assembly coupled to the oil and vapor extraction assembly. An oil and vapor separator is disposed downstream from the negative pressure assembly. The lubrication system also includes a control subsystem that maintains a cavity pressure lower than an air inlet pressure.

In another embodiment, a heavy duty gas turbine engine is provided. The heavy duty gas turbine engine includes an air inlet duct maintained at an air inlet pressure. An air inlet assembly is disposed in the air inlet duct. The air inlet assembly includes a bell mouth hood and defines a cavity maintained at a cavity pressure. A compressor bearing is disposed in the cavity; and a bearing lubrication assembly is coupled to the bearing. An extraction assembly is disposed in the cavity for extracting a mixture of oil and vapor from the cavity. A negative pressure assembly is coupled to the extraction assembly and an oil and vapor separator disposed downstream from the negative pressure assembly. The oil and vapor separator oil drain is coupled to the main lube oil reservoir. The heavy duty gas turbine engine also includes a control subsystem that maintains the cavity pressure lower than the air inlet pressure.

In another embodiment, a method for reducing oil mist ingestion by a compressor is disclosed. The method includes the steps of sensing a compressor inlet pressure and sensing a cavity pressure in a cavity in which a compressor bearing is disposed. The method also includes maintaining the cavity pressure lower than the compressor inlet pressure and extracting a vapor and oil mixture from the cavity with a vacuum blower. The vapor and oil mixture is conveyed to a separator downstream from the vacuum blower where oil is separated from the vapor and oil mixture. The separated oil is conveyed to the lube oil reservoir.

BRIEF DESCRIPTION OF THE DRAWINGS

Other features and advantages of the present invention will be apparent from the following more detailed description of the preferred embodiment, taken in conjunction with the accompanying drawings which illustrate, by way of example, the principles of certain aspects of the invention.

DETAILED DESCRIPTION OF THE INVENTION

Embodiments of the present invention relate to extracting oil and vapor mixtures that may form inside a cavity defined by a bearing bell mouth hood in a heavy duty gas turbine engine. An oil and vapor extraction assembly is disposed in the cavity and a negative pressure assembly is coupled to the oil and vapor extraction assembly. The negative pressure assembly is capable of continuous duty. An oil and vapor separator is disposed downstream from the negative pressure assembly. A control subsystem that maintains a cavity pressure lower than an air inlet pressure is also provided.

Figure 1:
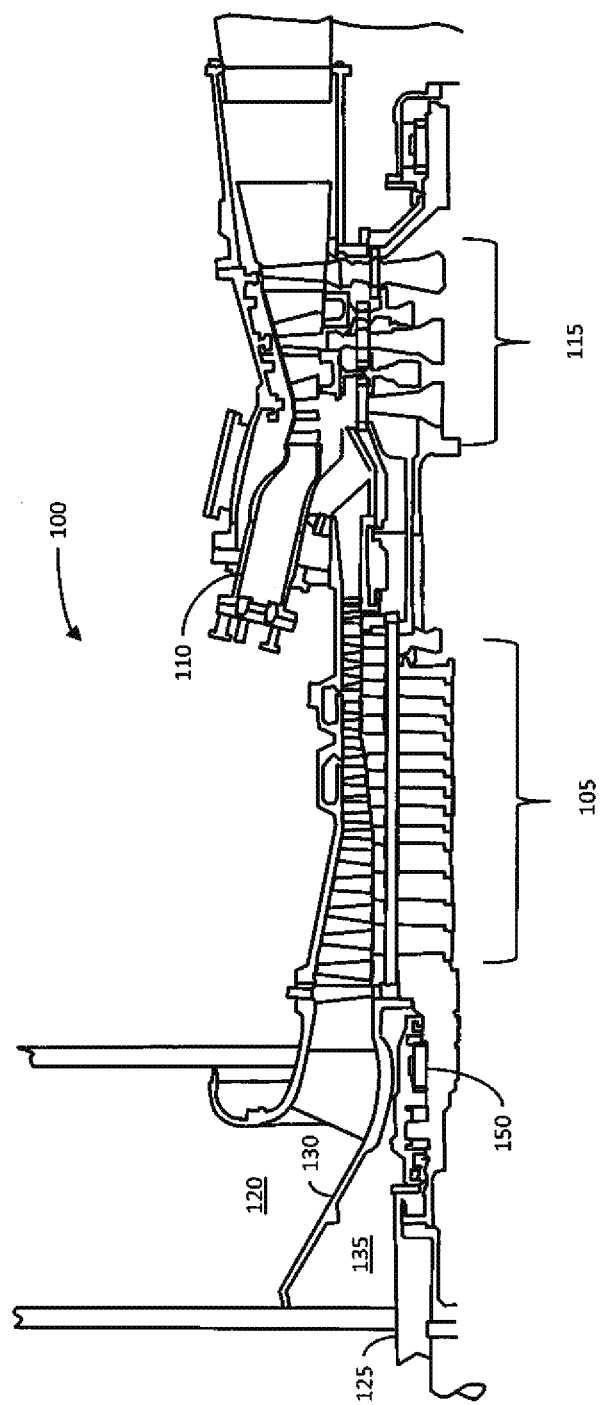
FIG. 1 is a schematic illustration of an embodiment of a gas turbine engine.

Illustrated in FIG. 1 is a top-half cutaway schematic illustration of an embodiment of a heavy duty gas turbine engine 100. The heavy duty gas turbine engine 100 includes a compressor 105, a combustor 110, and a turbine 115. In operation air enters the compressor 105 through compressor inlet 120 where it is compressed and conveyed to a combustor 110 where fuel is combusted and the exhaust is conveyed to turbine 115. Turbine 115 is coupled to a shaft 125 that is driven by the turbine 115. A bearing bell mouth hood 130 is disposed in the compressor inlet 120 and defines a cavity 135. The cavity 135 is sealed with bell mouth seal 140 and is maintained at a cavity pressure. The compressor inlet is at a compressor inlet pressure. Disposed in the cavity 135 is a compressor bearing 150. In the heavy duty gas turbine engine 100 the compressor bearing 150 may be a journal bearing.

Figure 2:
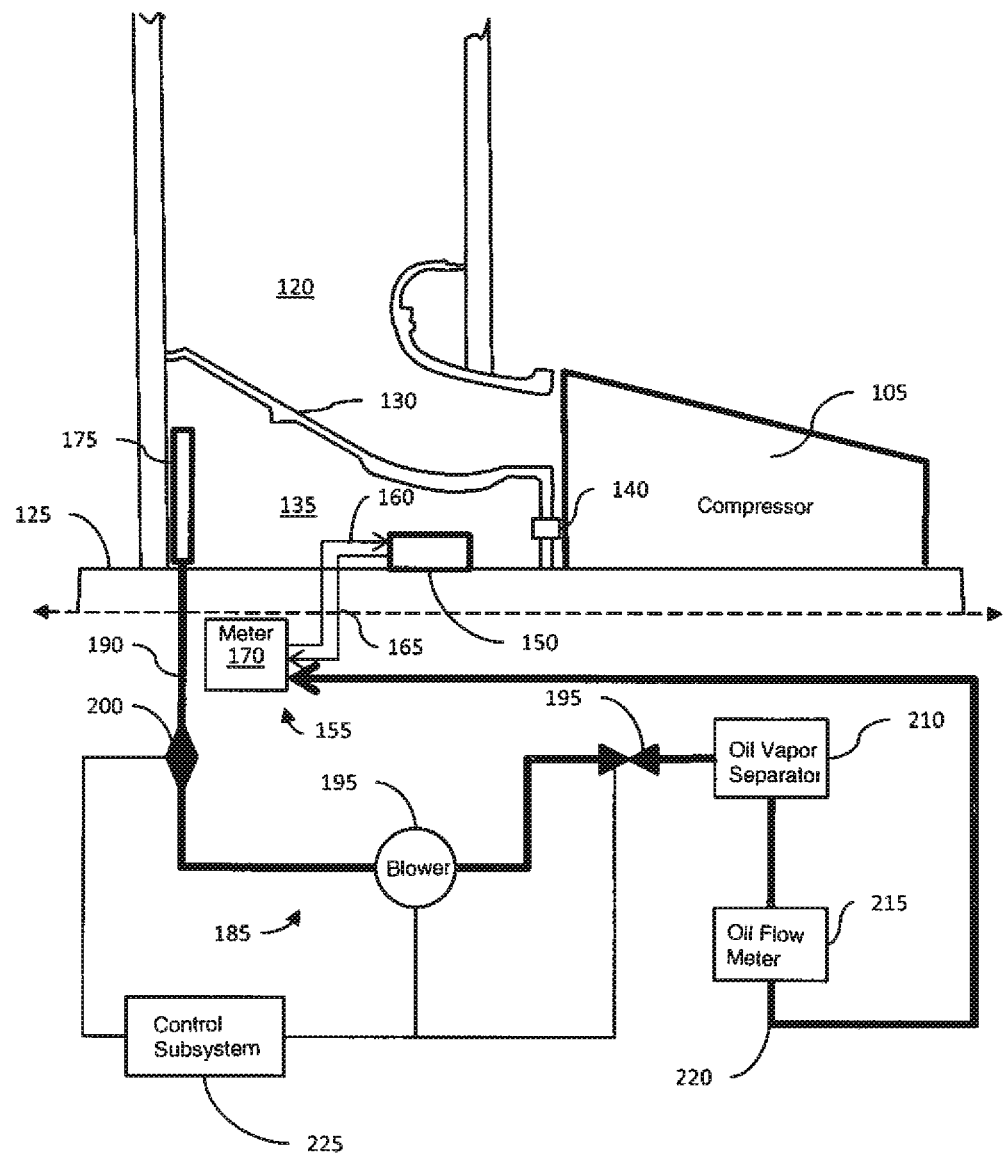
FIG. 2 is a schematic illustration of an oil mist extraction system.

As illustrated in FIG. 2, the compressor bearing 150 is lubricated by a bearing lubrication assembly 155 that includes a lubricant supply conduit 160, a lubricant scavenge conduit 165 and an oil reservoir 170.

Disposed within the cavity 135 is an oil/vapor extraction assembly 175. The oil/vapor extraction assembly 175 may include perforated piping that allows the passage of a mixture of oil and vapor to a negative pressure assembly 185. Negative pressure assembly 185 includes a negative pressure conduit 190 coupled to the oil/vapor extraction assembly 175 and a high volume vacuum blower 195. The high volume vacuum blower 195 is preferably driven by a variable frequency drive motor (not shown). A vacuum pressure sensor 200 may be disposed in the negative pressure conduit 190 between the oil/vapor extraction assembly 175 and the high volume vacuum blower 195. A modulating valve 205 may be disposed downstream from the high volume vacuum blower 195 and coupled to the negative pressure conduit 190. An oil vapor separator 210 is coupled to the negative pressure conduit 190 and disposed downstream from the high volume vacuum blower 195. The bearing lubrication assembly 155 may be provided with an oil flow meter 215 coupled to a return conduit 220. The bearing lubrication assembly may be controlled by a control subsystem 225 which may be a standalone controller or may be part of a controller for the heavy duty gas turbine engine 100. The control subsystem 225 receives an input from the vacuum pressure sensor 200 and the oil flow meter 215 and provides a control signal to the modulating valve 205 and to respective alarms.

In operation, the high volume vacuum blower 195 maintains a negative pressure differential between the pressure at the compressor inlet 120 and the cavity 135. Oil and vapor that may be emitted by the lubrication of the compressor bearing 150 are extracted from the cavity 135 through the oil/vapor extraction assembly 175. The extracted oil/vapor is conveyed to the oil/vapor separator 210 downstream from the high volume vacuum blower 195, where the oil is separated and returned to the oil reservoir 170 through the return 220. The amount of oil returned to the oil reservoir 170 is measured by the oil flow meter 215.

Figure 3:
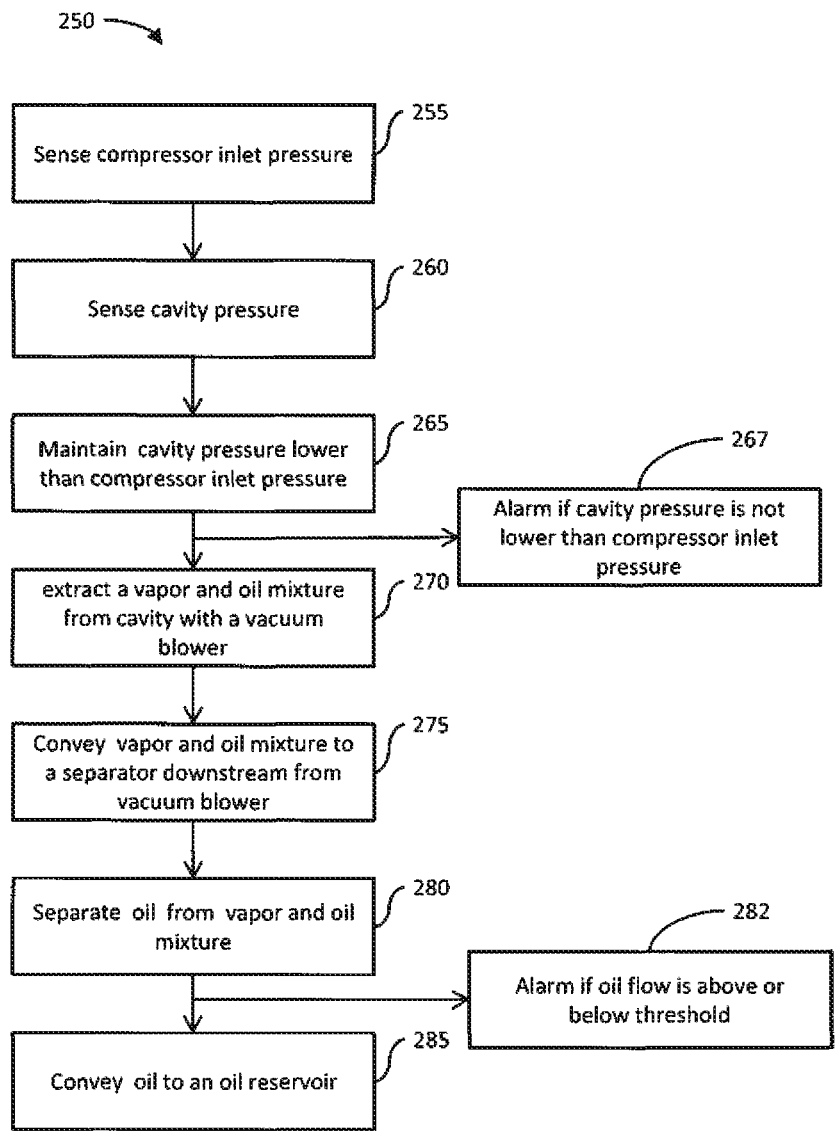
FIG. 3 is a flow chart illustrating a method for reducing oil mist ingestion by a compressor.

Illustrated in FIG. 3 is a method 250 for reducing oil mist ingestion by a compressor in accordance with one embodiment. The method 250 may be implemented by the control subsystem 215.

In step 255, the method 250 senses a compressor inlet pressure.

In step 260, the method 250 senses a cavity pressure in a cavity in which a compressor bearing is disposed.

In step 265, the method 250 maintains the cavity pressure lower than the compressor inlet pressure.

In step 267, the method 250 generates an alarm if the pressure in the cavity 135 is lower than the pressure at the compressor inlet 120.

In step 270, the method 250 extracts a vapor and oil mixture from the cavity with a vacuum blower.

In step 275, the method 250 conveys the vapor and oil mixture to a separator downstream from the vacuum blower.

In step 280, the method 250 separates oil from the vapor and oil mixture.

In step 282, the method 250 generates an alarm if the oil flow is above or below an established threshold.

In step 285, the method 250 conveys the oil to an oil reservoir. The method 250 may also include the steps of measuring a volume of oil conveyed to the oil reservoir and venting the vapor.

Where the definition of terms departs from the commonly used meaning of the term, applicant intends to utilize the definitions provided below, unless specifically indicated.

The terminology used herein is for the purpose of describing particular embodiments only and is not intended to be limiting of the invention. Where the definition of terms departs from the commonly used meaning of the term, applicant intends to utilize the definitions provided herein, unless specifically indicated. The singular forms "a," "an," and "the" are intended to include the plural forms as well, unless the context clearly indicates otherwise. It will be understood that, although the terms first, second, etc. may be used to describe various elements, these elements should not be limited by these terms. These terms are only used to distinguish one element from another. The term "and/or" includes any, and all, combinations of one or more of the associated listed items. The phrases "coupled to" and "coupled with" contemplates direct or indirect coupling.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements.

What is claimed:

1. A lubrication system for a heavy duty gas turbine having an air inlet duct, an air inlet assembly disposed in the air inlet duct, the air inlet assembly having a bell mouth hood defining a cavity, and a bearing disposed in the cavity, the lubrication system comprising:
    a bearing lubrication assembly coupled to the bearing;
    an oil and vapor extraction assembly disposed in the cavity;
    a negative pressure assembly coupled to the oil and vapor extraction assembly;
    an oil and vapor separator disposed downstream from the negative pressure assembly; and
    a control subsystem that maintains a cavity pressure lower than an air inlet pressure, and wherein the negative pressure assembly comprises a high volume vacuum blower.

2. The lubrication system of claim 1, wherein the oil and vapor extraction assembly comprises extraction piping disposed in the cavity.

3. The lubrication system of claim 1, wherein the negative pressure assembly further comprises a conduit coupling the oil and vapor extraction assembly with the high volume vacuum blower.

4. The lubrication system of claim 3, further comprising a vacuum pressure sensor disposed in the conduit.

5. The lubrication system of claim 4, further comprising a modulating valve disposed between the high volume vacuum blower and the oil and vapor separator.

6. The lubrication system of claim 4, further comprising an oil flow meter disposed downstream of the oil and vapor separator.

7. The lubrication system claim 1, further comprising a conduit for transporting oil separated in the oil and vapor separator to an oil reservoir.

8. A heavy duty gas turbine engine, comprising:
    an air inlet duct maintained at an air inlet pressure;
    an air inlet assembly disposed in the air inlet duct, the air inlet assembly comprising a bell mouth hood and defining a cavity maintained at a cavity pressure;
    a compressor bearing disposed in the cavity;
    a bearing lubrication assembly coupled to the bearing;
    an extraction assembly disposed in the cavity for extracting a mixture of oil and vapor from the cavity;
    a negative pressure assembly coupled to the extraction assembly;
    an oil and vapor separator disposed downstream from the negative pressure assembly; and
    a control subsystem that maintains the cavity pressure lower than the air inlet pressure, and wherein the negative pressure assembly comprises a high volume vacuum blower.

9. The heavy duty gas turbine engine of claim 8, wherein the extraction assembly comprises extraction piping disposed in the cavity.

10. The heavy duty gas turbine engine of claim 8, wherein the negative pressure assembly further comprises a conduit coupling the extraction assembly with the high volume vacuum blower.

11. The heavy duty gas turbine engine of claim 10, wherein the negative pressure assembly further comprises a pressure sensor disposed in the conduit.

12. The heavy duty gas turbine engine of claim 11, further comprising a modulating valve disposed between the high volume vacuum blower and the oil and vapor separator.

13. The heavy duty gas turbine engine of claim 12, wherein the control subsystem receives an input from the pressure sensor that provides an output to the modulating valve.

14. The heavy duty gas turbine engine of claim 12, further comprising an oil flow meter disposed downstream from the oil and vapor separator.

15. A method for reducing oil mist ingestion by a compressor, the method comprising:
    sensing a compressor inlet pressure;
    sensing a cavity pressure in a cavity in which a compressor bearing is disposed;
    maintaining the cavity pressure lower than the compressor inlet pressure;
    generating an alarm if the cavity pressure is not below compressor inlet pressure;
    extracting a vapor and oil mixture from the cavity with a vacuum blower;
    conveying the vapor and oil mixture to a separator downstream from the vacuum blower;
    separating oil from the vapor and oil mixture;
    conveying the oil to an oil reservoir
    sensing the oil flow;
    generating an alarm if the oil flow is above or below thresholds.

16. The method of claim 15 wherein extracting a vapor and oil mixture comprises extracting a vapor oil mixture through extraction piping disposed in the cavity.

17. The method of claim 15 further comprising measuring a volume of oil conveyed to the oil reservoir.

18. The method of claim 15 further comprising venting the vapor to atmosphere.

* * * * *